United States Patent
Samadi et al.

(10) Patent No.: US 9,064,077 B2
(45) Date of Patent: Jun. 23, 2015

(54) 3D FLOORPLANNING USING 2D AND 3D BLOCKS

(71) Applicant: QUALCOMM Incorporated, San Diego, CA (US)

(72) Inventors: Kambiz Samadi, San Diego, CA (US); Shreepad A. Panth, Atlanta, GA (US); Yang Du, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/792,384

(22) Filed: Mar. 11, 2013

(65) Prior Publication Data

US 2014/0149958 A1    May 29, 2014

Related U.S. Application Data

(60) Provisional application No. 61/730,743, filed on Nov. 28, 2012, provisional application No. 61/730,755, filed on Nov. 28, 2012.

(51) Int. Cl.
*G06F 17/50*    (2006.01)

(52) U.S. Cl.
CPC ........ *G06F 17/5072* (2013.01); *G06F 2217/66* (2013.01)

(58) Field of Classification Search
CPC .............. G06F 17/5072; G06F 2217/66
See application file for complete search history.

(56) References Cited

U.S. PATENT DOCUMENTS

| | | | |
|---|---|---|---|
| 5,606,186 A | 2/1997 | Noda | |
| 5,636,125 A * | 6/1997 | Rostoker et al. | 700/121 |
| 5,724,557 A | 3/1998 | McBean, Sr. | |
| 6,040,203 A | 3/2000 | Bozso et al. | |
| 6,125,217 A | 9/2000 | Paniccia et al. | |
| 6,260,182 B1 * | 7/2001 | Mohan et al. | 716/121 |
| 6,295,636 B1 | 9/2001 | Dupenloup | |
| 6,305,001 B1 | 10/2001 | Graef | |
| 6,374,200 B1 * | 4/2002 | Nakagawa | 703/8 |
| 6,448,168 B1 | 9/2002 | Rao et al. | |
| 6,627,985 B2 * | 9/2003 | Huppenthal et al. | 257/686 |

(Continued)

FOREIGN PATENT DOCUMENTS

| | | |
|---|---|---|
| EP | 1432032 A2 | 6/2004 |
| EP | 2551898 A1 | 1/2013 |

(Continued)

OTHER PUBLICATIONS

Cong et al.; "Three Dimensional System Integration"; Springer, Jan. 2011; e-ISBN 978-1-4419-0962-6; pp. 1-246.*

(Continued)

*Primary Examiner* — Naum B Levin
(74) *Attorney, Agent, or Firm* — Nicholas J. Pauley; Peter Michael Kamarchik; Paul Holdaway

(57) ABSTRACT

The disclosed embodiments are directed to systems and method for floorplanning an integrated circuit design using a mix of 2D and 3D blocks that provide a significant improvement over existing 3D design methodologies. The disclosed embodiments provide better floorplan solutions that further minimize wirelength and improve the overall power/performance envelope of the designs. The disclosed methodology may be used to construct new 3D IP blocks to be used in designs that are built using monolithic 3D integration technology.

18 Claims, 3 Drawing Sheets

(56) References Cited

U.S. PATENT DOCUMENTS

| | | | |
|---|---|---|---|
| 6,727,530 B1* | 4/2004 | Shen et al. | 257/184 |
| 6,754,877 B1 | 6/2004 | Srinivasan | |
| 6,834,380 B2* | 12/2004 | Khazei | 716/115 |
| 6,846,703 B2 | 1/2005 | Shimoda et al. | |
| 6,965,527 B2 | 11/2005 | Fasoli et al. | |
| 6,979,630 B2 | 12/2005 | Walitzki | |
| 7,107,200 B1 | 9/2006 | Korobkov | |
| 7,173,327 B2 | 2/2007 | Siniaguine | |
| 7,209,378 B2 | 4/2007 | Nejad et al. | |
| 7,280,397 B2 | 10/2007 | Scheuerlein | |
| 7,288,418 B2 | 10/2007 | Barge et al. | |
| 7,298,641 B2 | 11/2007 | Madurawe et al. | |
| 7,356,781 B2* | 4/2008 | Koeder et al. | 716/55 |
| 7,459,716 B2 | 12/2008 | Toda et al. | |
| 7,546,571 B2* | 6/2009 | Mankin et al. | 716/137 |
| 7,579,654 B2 | 8/2009 | Couillard et al. | |
| 7,622,955 B2 | 11/2009 | Vilangudipitchai et al. | |
| 7,653,884 B2* | 1/2010 | Furnish et al. | 716/103 |
| 7,663,620 B2* | 2/2010 | Robertson et al. | 345/419 |
| 7,669,152 B1* | 2/2010 | Tcherniaev et al. | 716/136 |
| 7,796,092 B2* | 9/2010 | Holly et al. | 343/820 |
| 7,877,719 B2 | 1/2011 | He | |
| 7,964,916 B2 | 6/2011 | Or-Bach et al. | |
| 7,969,193 B1 | 6/2011 | Wu et al. | |
| 7,989,226 B2 | 8/2011 | Peng | |
| 8,006,212 B2 | 8/2011 | Sinha et al. | |
| 8,026,521 B1 | 9/2011 | Or-Bach et al. | |
| 8,046,727 B2* | 10/2011 | Solomon | 716/116 |
| 8,059,443 B2 | 11/2011 | McLaren et al. | |
| 8,060,843 B2 | 11/2011 | Wang et al. | |
| 8,114,757 B1 | 2/2012 | Or-Bach et al. | |
| 8,115,511 B2 | 2/2012 | Or-Bach | |
| 8,136,071 B2* | 3/2012 | Solomon | 716/119 |
| 8,146,032 B2* | 3/2012 | Chen et al. | 716/106 |
| 8,164,089 B2 | 4/2012 | Wu et al. | |
| 8,208,282 B2 | 6/2012 | Johnson et al. | |
| 8,218,377 B2 | 7/2012 | Tandon et al. | |
| 8,222,696 B2 | 7/2012 | Yamazaki et al. | |
| 8,230,375 B2 | 7/2012 | Madurawe | |
| 8,258,810 B2 | 9/2012 | Or-Bach et al. | |
| 8,298,875 B1 | 10/2012 | Or-Bach et al. | |
| 8,332,803 B1* | 12/2012 | Rahman | 716/136 |
| 8,450,804 B2* | 5/2013 | Sekar et al. | 257/347 |
| 8,576,000 B2 | 11/2013 | Kim et al. | |
| 8,683,416 B1 | 3/2014 | Trivedi et al. | |
| 8,701,073 B1* | 4/2014 | Fu et al. | 716/133 |
| 8,803,206 B1 | 8/2014 | Or-Bach et al. | |
| 8,803,233 B2 | 8/2014 | Cheng et al. | |
| 2004/0036126 A1 | 2/2004 | Chau et al. | |
| 2004/0113207 A1 | 6/2004 | Hsu et al. | |
| 2004/0241958 A1 | 12/2004 | Guarini et al. | |
| 2005/0280061 A1 | 12/2005 | Lee | |
| 2006/0190889 A1* | 8/2006 | Cong et al. | 716/8 |
| 2007/0040221 A1 | 2/2007 | Gossner et al. | |
| 2007/0147157 A1 | 6/2007 | Luo et al. | |
| 2007/0244676 A1* | 10/2007 | Shang et al. | 703/2 |
| 2008/0276212 A1 | 11/2008 | Albrecht | |
| 2008/0283995 A1 | 11/2008 | Bucki et al. | |
| 2008/0291767 A1 | 11/2008 | Barnes et al. | |
| 2009/0070728 A1* | 3/2009 | Solomon | 716/16 |
| 2009/0174032 A1 | 7/2009 | Maejima et al. | |
| 2009/0302394 A1 | 12/2009 | Fujita | |
| 2010/0031217 A1* | 2/2010 | Sinha et al. | 716/10 |
| 2010/0115477 A1 | 5/2010 | Albrecht et al. | |
| 2010/0140790 A1* | 6/2010 | Setiadi et al. | 257/698 |
| 2010/0193770 A1 | 8/2010 | Bangsaruntip et al. | |
| 2010/0229142 A1 | 9/2010 | Masleid et al. | |
| 2010/0276662 A1 | 11/2010 | Colinge | |
| 2011/0049594 A1 | 3/2011 | Dyer et al. | |
| 2011/0053332 A1 | 3/2011 | Lee | |
| 2011/0059599 A1 | 3/2011 | Ward et al. | |
| 2011/0078222 A1 | 3/2011 | Wegener | |
| 2011/0084314 A1* | 4/2011 | Or-Bach et al. | 257/209 |
| 2011/0121366 A1 | 5/2011 | Or-Bach et al. | |
| 2011/0215300 A1 | 9/2011 | Guo et al. | |
| 2011/0221502 A1 | 9/2011 | Meijer et al. | |
| 2011/0222332 A1 | 9/2011 | Liaw et al. | |
| 2011/0253982 A1 | 10/2011 | Wang et al. | |
| 2011/0272788 A1 | 11/2011 | Kim et al. | |
| 2011/0280076 A1* | 11/2011 | Samachisa et al. | 365/185.17 |
| 2011/0298021 A1 | 12/2011 | Tada et al. | |
| 2012/0012972 A1 | 1/2012 | Takafuji et al. | |
| 2012/0056258 A1 | 3/2012 | Chen | |
| 2012/0129276 A1* | 5/2012 | Haensch et al. | 438/7 |
| 2012/0129301 A1 | 5/2012 | Or-Bach et al. | |
| 2012/0152322 A1* | 6/2012 | Kribus et al. | 136/249 |
| 2012/0171108 A1 | 7/2012 | Kim et al. | |
| 2012/0181508 A1 | 7/2012 | Chang et al. | |
| 2012/0187486 A1 | 7/2012 | Goto et al. | |
| 2012/0193621 A1 | 8/2012 | Or-Bach et al. | |
| 2012/0195136 A1 | 8/2012 | Yoko | |
| 2012/0217479 A1 | 8/2012 | Chang et al. | |
| 2012/0280231 A1 | 11/2012 | Ito et al. | |
| 2012/0286822 A1 | 11/2012 | Madurawe | |
| 2012/0304142 A1 | 11/2012 | Morimoto et al. | |
| 2012/0305893 A1 | 12/2012 | Colinge | |
| 2012/0313227 A1 | 12/2012 | Or-Bach et al. | |
| 2013/0026539 A1 | 1/2013 | Tang et al. | |
| 2013/0026608 A1 | 1/2013 | Radu | |
| 2013/0105897 A1 | 5/2013 | Bangsaruntip et al. | |
| 2013/0148402 A1* | 6/2013 | Chang et al. | 365/63 |
| 2013/0240828 A1 | 9/2013 | Ota et al. | |
| 2013/0299771 A1 | 11/2013 | Youn et al. | |
| 2014/0008606 A1 | 1/2014 | Hussain et al. | |
| 2014/0035041 A1 | 2/2014 | Pillarisetty et al. | |
| 2014/0085959 A1* | 3/2014 | Saraswat et al. | 365/63 |
| 2014/0097868 A1* | 4/2014 | Ngai | 326/41 |
| 2014/0145347 A1* | 5/2014 | Samadi et al. | 257/774 |
| 2014/0225218 A1 | 8/2014 | Du | |
| 2014/0225235 A1 | 8/2014 | Du | |
| 2014/0269022 A1 | 9/2014 | Xie et al. | |

FOREIGN PATENT DOCUMENTS

| | | |
|---|---|---|
| FR | 2973938 A1 | 10/2012 |
| JP | H06204810 A | 7/1994 |
| JP | 2001160612 A | 6/2001 |
| KR | 20010109790 A | 12/2001 |
| KR | 20080038535 A | 5/2008 |
| WO | 2011112300 A1 | 9/2011 |
| WO | 2012113898 A1 | 8/2012 |
| WO | 2013045985 A1 | 4/2013 |

OTHER PUBLICATIONS

Co-pending U.S. Appl. No. 13/784,915, filed Mar. 5, 2013.
Co-pending U.S. Appl. No. 13/788,224, filed Mar. 7, 2013.
Co-pending U.S. Appl. No. 13/792,486, filed Mar. 11, 2013.
Co-pending U.S. Appl. No. 13/792,592, filed Mar. 11, 2013.
Fujio I. et al., "Level Conversion for Dual-Supply Systems", IEEE Transactions on Very Large Scale Integration (VLSI) Systems, vol. 12, No. 2, Feb. 2004, pp. 185-195.
Mototsugu H. et al., "A Top-Down Low Power Design Technique Using Clustered Voltage Scaling with Variable Supply-Voltage Scheme", IEEE 1998 Custom Integrated Circuits Conference, pp. 495-498.
Arunachalam V., et al., "Low-power clock distribution in microprocessor", Proceedings of the 18th ACM Great Lakes Symposium on VLSI , GLSVLSI '08, Jan. 1, 2008, 3 pages, XP055106715, New York, USA DOI: 10.1145/1366110.1366212 ISBN: 978-1-59-593999-9 p. 429-p. 434.
Co-pending U.S. Appl. No. 13/792,384, filed Mar. 11, 2013.
Donno M., et al., "Power-aware clock tree planning", Proceedings of the 2004 International Symposium on Physical Design, ISPD '04, Jan. 1, 2004, 5 pages, XP055106989, New York, New York, USA DOI: 10.1145/981066.981097 ISBN: 978-1-58-113817-7 p. 140-p. 144.
Ganguly S., et al., "Clock distribution design and verification for PowerPC microprocessors", Computer-Aided Design, 1997, Digest of Technical Papers., 1997 IEEE/AC M International Conference on San Jose, CA, USA Nov. 9-13, 1997, Los Alamitos, CA, USA, IEEE Comput. Soc, US, Nov. 5, 1995, pp. 58-61, XP032372227, DOI:

(56) References Cited

OTHER PUBLICATIONS 10.1109/ICCAD.1995.479991 ISBN: 978-0-8186-8200-1 p. 58-p. 61.
Tsao C.W.A., et al., "UST/DME: a clock tree router for general skew constraints", Computer Aided Design, 2000, ICCAD-2000, IEEE/ACM International Conference on, IEEE, Nov. 5, 2000, pp. 400-405, XP032402965, DOI: 10.1109/ICCAD.2000.896505 ISBN: 978-0-7803-6445-5 p. 400-p. 401.
Xie J., et al., "CPDI: Cross-power-domain interface circuit design in monolithic 3D technology", Quality Electronic Design (ISQED), 2013 14th International Symposium on, IEEE, Mar. 4, 2013, pp. 442-447, XP032418452, DOI: 10.1109/ISQED.20136523649 ISBN: 978-1-4673-4951-2 Section II. "Monolithic 3D Technology"; figures 1,3.
Cong J. et al., "An automated design flow for 3d microarchitecture evaluation", Design Automation, 2006. Asia and South Pacific Conference on Jan. 24, 2006, Piscataway, NJ, USA, IEEE, Jan. 24, 2006, pp. 384-389, XP010899545, DOI: 10.1109/ASPDAC.2006.1594713, ISBN: 978-0-7803-9451-3, the whole document.
Freidman, E. G., "Clock Distribution Networks in Synchronous Digital Integrated Circuits", 2001, IEEE, Proceedings of the IEEE, vol. 89, No. 5, pp. 665-692.
International Search Report and Written Opinion—PCT/US2013/072384—ISA/EPO—Sep. 12, 2014.
Jain A. et al., "Thermala electrical co-optimisation of floorplanning of three-dimensional integrated circuits under manufacturing and physical design constraints", IET Computers and Digital Techniques,, vol. 5, No. 3, May 9, 2011, pp. 169-178, XP006037867, ISSN: 1751-861X, DOI:10.1049/1ET-CDT:20090107, pp. 170-172.
Khan Q.A., et al., "A Single Supply Level Shifter for Multi-Voltage Systems," IEEE Proceedings of the 19th International Conference on VLSI Design (VLSID'06), 2006, 4 pages.

Kim, T-Y., et al., "Clock Tree Syntheis for TSV-Based 3d IC designs", Oct. 2011, ACM, ACM Transactions on Design Automation of Electronic Systems, vol. 16, No. 4m Article 48, pp. 48:1-48:21.
Kulkarni J., et al., "Capacitive-Coupling Wordline Boosting with Self-Induced VCC Collapse for White VMIN Reduction in 22-nm 8T SRAM," IEEE International Solid-State Circuits Conference, 2012, pp. 234-236.
Lin, C-T., et al., "CAD reference flow for 3d Via-Last Integrated Circuits", 2010, IEEE, pp. 187-192.
Lin S., et al., A New Family of Sequential Elements with Built-in Soft Error Tolerance for Dual-VDD Systems, IEEE Transactions on Very Large Scale Integration (VLSI) Systems, 2008, vol. 16(10), pp. 1372-1384.
Loh, Gabriel H. et al., "Processor design in 3D die-stacking technologies," IEEE 2007 p. 31-48.
Minz J. et al., "Block-level 3-D Global Routing With an Application to 3-D Packaging", IEEE Transactions on Computer-Aided Design of Integrated Circuits and Systems, vol. 25, No. 10, Oct. 1, 2006, pp. 2248-2257, XP055137904, ISSN: 0278-0070,DOI:10.1109/TCAD.2005.860952 p. 2249-p. 2252.
Minz J. et al., "Channel and Pin Assignment for Three Dimensional Packaging Routing", May 24, 2004, pp. 1-6, XP055138056, Georgia Tech. Library. CERCS; GIT-CERCS-04-21, Retrieved from the Internet: URL:http://www.ceres.gatech.edu/tech-reports/tr2004/git-cercs-04-21.pdf.
Bobba S., et al., "Performance Analysis of 3-D Monolithic Integrated Circuits", 2010 IEEE International 3D Systems Integration Conference (3DIC), Nov. 1, 2010, pp. 1-4, XP55165273, DOI: 10.1109/3DIC.2010.5751465,ISBN: 978-1-45-770526-7.

\* cited by examiner

3D FLOORPLANNING USING 2D AND 3D BLOCKS

CLAIM OF PRIORITY UNDER 35 U.S.C. §119

The present application for patent claims priority to the following:
Provisional Application No. 61/730,743 entitled "3D FLOORPLANNING USING 2D AND 3D BLOCKS," filed Nov. 28, 2012, and assigned to the assignee hereof and hereby expressly incorporated by reference herein.
Provisional Application No. 61/730,755 entitled "CLOCK DISTRIBUTION NETWORK FOR 3D INTEGRATED CIRCUIT," filed Nov. 28, 2012, and assigned to the assignee hereof and hereby expressly incorporated by reference herein.

REFERENCE TO CO-PENDING APPLICATIONS FOR PATENT

The present application for patent is related to the following co-pending U.S. Patent Application(s):
"MONOLITHIC 3D IC FLIP-FLOP DESIGN" by Yang Du, Jing Xie and Kambiz Samadi, having application Ser. No. 13/784,915, filed Mar. 5, 2013, assigned to the assignee hereof, and expressly incorporated by reference herein;
"MONOLITHIC THREE DIMENSIONAL INTEGRATION OF SEMICONDUCTOR INTEGRATED CIRCUITS" by Yang Du, having application Ser. No. 13/788,224, filed Mar. 7, 2013, assigned to the assignee hereof, and expressly incorporated by reference herein; and
"CLOCK DISTRIBUTION NETWORK FOR 3D INTEGRATED CIRCUIT" by Kambiz Samadi, Shreepad Panth, Jing Xie and Yang Du, having application Ser. No. 13/792,486, filed Mar. 11, 2013, assigned to the assignee hereof, and expressly incorporated by reference herein.

FIELD OF DISCLOSURE

The disclosed embodiments are directed in general to the efficient floorplanning of integrated circuits. More specifically, the disclosed embodiments are directed to systems and methods for floorplanning a 3D integrated circuit that minimizes wirelength and improves the overall power/performance envelope of the design.

BACKGROUND

In electronic design automation, a floorplan of an integrated circuit is a schematic representation of tentative placement of its major functional blocks. In modern electronic design process, floorplans are created during the floorplanning stage, which is an early stage in the hierarchical approach to chip design. Floorplanning takes into account some of the geometrical constraints in a design, including for example the location of bonding pads for off-chip connections.

It would be advantageous to implement flip-flops and other integrated circuitry in a 3D format. A 3D semiconductor device (or stacked IC device) can contain two or more semiconductor devices stacked vertically so they occupy less space than two or more conventionally arranged semiconductor devices. The stacked IC device is a single integrated circuit built by stacking silicon wafers and/or ICs and interconnecting them vertically so that they behave as a single device.

Conventionally, the stacked semiconductor devices are wired together using input/output ports either at the perimeter of the device or across the area of the device or both. The input/output ports slightly increase the length and width of the assembly. In some new 3D stacks, through-silicon vias (TSVs) completely or partly replace edge wiring by creating vertical connections through the body of the semiconductor device. By using TSV technology, stacked IC devices can pack a great deal of functionality into a small footprint. This TSV technique is sometimes also referred to as TSS (Through Silicon Stacking).

Device scaling and interconnect performance mismatch has increased exponentially (i.e., up to 50× for global and up to 163× for local interconnects) and is expected to continue to increase even further. This exponential increase in device and interconnect performance mismatch has forced designers to use techniques such as heavy buffering of global interconnects which subsequently has increased chip area and power. Current 3D methodologies only try to assemble 2D blocks into 3D stacks. This approach only helps to reduce the inter-block nets, if applicable, and does not leverage the 3D-IC within the blocks and further improvements are left on the table. The following two references disclose known 3D block-level TSV planning and 3D floorplanning of 2D blocks, respectively: D. H. Kim, R. O. Topaloglu and S. K. Lim, "Block-Level 3D IC Design with Through-Silicon-Via Planning", Proc. ASPDAC, 2011, pp. 335-340; and J. Knechtel, I. Markov and J. Lienig, "Assembling 2-D Blocks Into Chips", IEEE Trans. On CAD, 2012, pp. 228-241.

Accordingly, there is a need for systems and methods to improve the capabilities of 3D designs, thereby minimizing wirelength and improving the overall power/performance envelope of the 3D design.

SUMMARY

The disclosed embodiments are directed to systems and method for floorplanning an integrated circuit design using a mix of 2D and 3D blocks that provide a significant improvement over existing 3D design methodologies. The disclosed embodiments provide better floorplan solutions that further minimize wirelength and improve the overall power/performance envelope of the designs. The disclosed embodiments include methodologies that may be used to construct new 3D IP blocks to be used in designs that are built using monolithic 3D integration technology. In electronic design a semiconductor intellectual property (IP) core or IP block is a reusable unit of logic, cell, or chip layout design. IP blocks/cores are typically pre-designed circuitry that can be used as building blocks for a larger design that includes the pre-designed block.

More specifically, the disclosed embodiments include a method of generating a library of blocks to be floorplanned, the steps comprising: assembling a plurality of blocks comprising 2D implementations and 3D implementations; providing a first additional tier for at least one of said plurality of blocks and generating a first re-implementation of said at least one of said plurality of blocks that includes said first additional tier; evaluating at least one performance objective of said first re-implementation to determine whether said at least one performance objective has improved; and adding said first re-implementation to the library of blocks to be floorplanned if a result of said evaluating step is that said at least one performance objective has improved. The above-described method may further comprise the steps of: if said at least one performance parameter improved, providing a second additional tier for said at least one of said plurality of blocks and generating a second reimplementation of said at least one of said plurality of blocks that includes said second additional tier; further evaluating said at least one performance objective for said second re-implementation to determine whether said at least one performance objective has improved; and adding said second re-implementation to the library of blocks to be floorplanned if a result of said further evaluating step is that said at least one performance objective has improved.

The above-described methods of the disclosed embodiments may further include: the step of adding said 3D implementations to the library of blocks to be floorplanned; floorplanning the library of blocks wherein said floorplanning utilizes a simulated annealing 3D floorplan engine and comprises monolithic 3D floorplanning having a network of high density vias; and the step of using said 3D floorplanning to generate an IP block that may be used for a larger design that includes the IP block.

BRIEF DESCRIPTION OF THE DRAWINGS

The accompanying drawings are presented to aid in the description of disclosed embodiments and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the terms "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
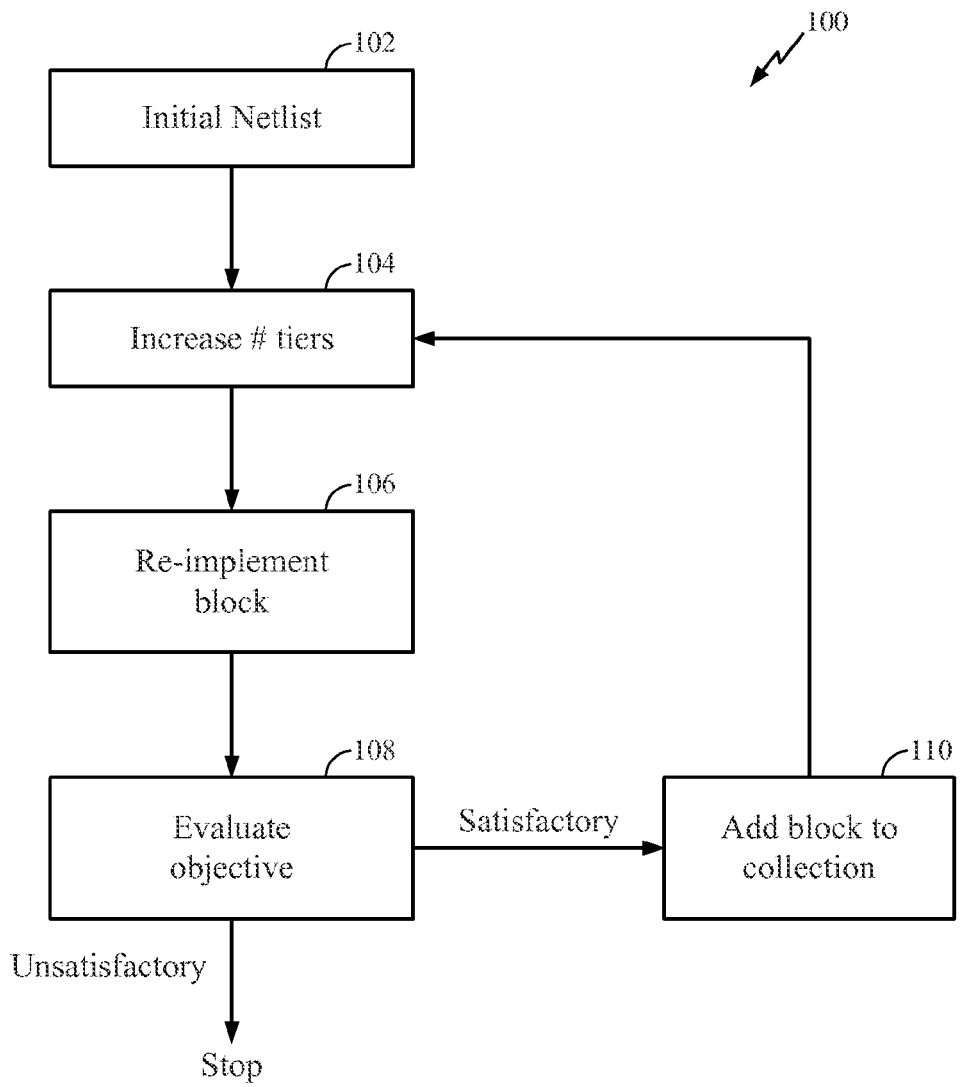
FIG. 1 is a flow diagram of the disclosed embodiments illustrating a basic methodology to characterize existing 2D and/or 3D blocks into improved, re-implemented counterpart blocks, if applicable, to improve their power/performance envelope with respect to those of the existing 2D and/or 3D blocks.

FIG. 1 is a flow diagram illustrating a basic methodology of the disclosed embodiment. The methodology 100 of FIG. 1 characterizes or re-implements existing 2D and/or 3D blocks into multiple counterpart blocks (which may also be 2D and/or 3D), if applicable, to improve their power/performance envelope with respect to those of the existing 2D and/or 3D blocks. Some blocks may perform better when folded across additional tiers. The goal is to further expand and re-implement the existing blocks to come up with a set of improved blocks that outperform their counterparts. Methodology 100 starts at step 102 with an initial netlist that includes existing 2D and/or 3D blocks. At step 104, the number of tiers is increased, and the initial block is then re-implemented at step 106. The re-implementation includes partitioning the netlist across the tiers, placing and routing each tier, and inserting vias. In general, a netlist is a boolean algebra representation of a logical function implemented as generic gates or process specific standard cells. For monolithic 3D applications, the vias are preferably high density inter-tier vias. Step 108 evaluates the objective to determine whether the additional tier added at step 104 improved the design. For example, a weighted sum of the total silicon area, timing and power may be considered the objective. Because the blocks are much smaller than the entire design it is preferable to use at step 108 post-layout timing, power and area values for increased accuracy. If the evaluation at step 108 is satisfactory, i.e., the additional tier improved the block, the improved block is added to the block collection at step 110, and the methodology 100 returns to block 104 to further increase the number of tiers. If the evaluation at step 108 is unsatisfactory, methodology 100 determines that the most recently added tier did not improve the block, and methodology 100 stops. Thereby, methodology 100 identifies blocks that perform better when folded across additional tiers, resulting in a set/library of improved, re-implemented blocks (step 110) that outperform their existing 2D and/or 3D counterparts.

Figure 2:
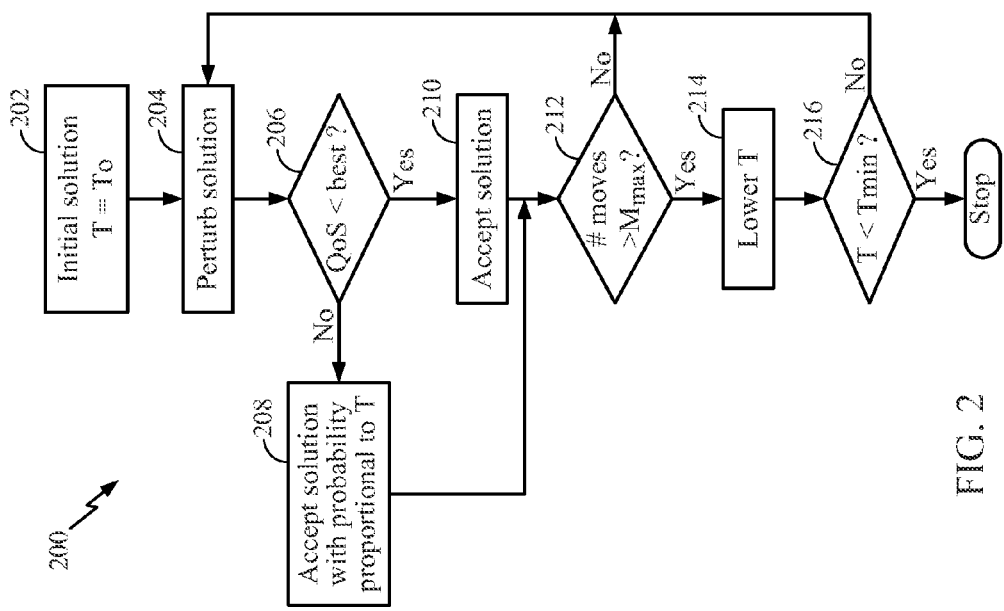
FIG. 2 is a flow diagram further illustrating 3D floorplanning of the disclosed embodiments using a mix of improved, re-implemented 2D and/or 3D blocks and a simulated annealing framework to implement the disclosed 3D floorplanning engine.

FIG. 2 is a flow diagram of another methodology 200 that further illustrates 3D floorplanning of the disclosed embodiments using the improved, re-implemented mix of 2D and 3D blocks. In the disclosed design scenario, a set of blocks (including the block collection developed at step 110 of FIG. 1) must be floorplanned into a 3D stack. Each block comes as 2D and 3D implementations with varying number of tiers, timing, power and area footprint. The objective is determined by the weighted sum of area footprint, wire length and delay. Other derivative objective functions could be considered depending on the specific design. The output is to determine (i) the choice of block implementation for each block (i.e., 2D or 3D) and (ii) the (x, y, z) coordinate of each block that minimizes the above objective function.

Methodology 200 of FIG. 2 shows a simulated annealing framework to implement the disclosed 3D floorplanning engine. Simulated annealing is an artificial intelligence technique based on the behavior of cooling metal. It can be used to find solutions to difficult or impossible combinatorial optimization problems. Methodology 200 begins at step 202 by identifying an initial solution wherein a global parameter T is set to an initial value of $T_0$. Although the global parameter T is generally referred to as a temperature, T is not related to a physical temperature. Instead, T is a global parameter used to control advancement of the simulated annealing-based 3D floorplan engine. Step 204 then perturbs a solution, and step 206 evaluates whether a quality of service (QoS) parameter is below its best level. QoS is the ability to provide different priority to different applications, users, or data flows, or to guarantee a certain level of performance to a data flow. For example, a required bit rate, delay, jitter, packet dropping probability and/or bit error rate may be guaranteed. If the determination at step 206 is no, methodology 200 accepts at step 208 the solution having a probability proportional to T, then proceeds to step 212. If the determination at step 206 is yes, methodology 200 accepts the solution at step 210, then proceeds to step 212. Step 212 determines whether the number of moves is greater than the maximum moves for a given T, which is set at Mmax. If the answer to step 212 is no, methodology 200 returns to step 204 and further perturbs the solution. If the answer to step 212 is yes, step 214 lowers global parameter T, then evaluates at step 216 whether T is now less than Tmin (a stopping "temperature"). If the answer to step 216 is yes, methodology 200 stops. If the answer to step 216 is no, methodology 200 returns to step 204 and further perturbs the solution.

Figure 3:
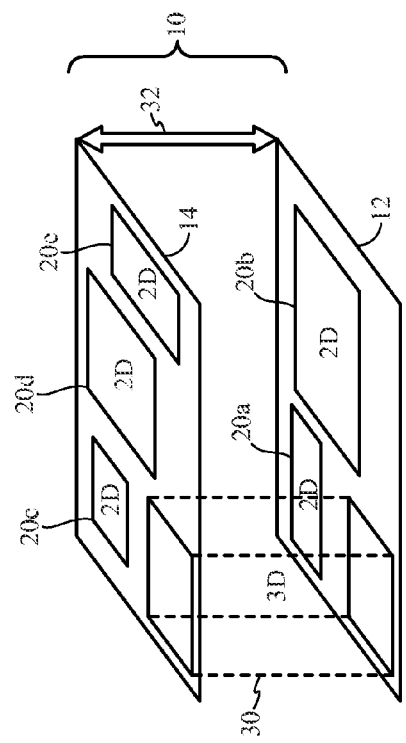
FIG. 3 is an example of a 3D floorplan with one block being implemented in 3D and rest in 2D.

FIG. 3 is an example of a multi-tier integrated circuit floorplan 10 that can result from the methodologies 100, 200 of FIGS. 1 and 2. The overall floorplan 10 is 3D, with one block being implemented in 3D and the rest in 2D. As illustrated, the multi-tier integrated circuit 10 includes a first tier 12 and a second tier 14. One block 30 is implemented in 3D spanning tier 12 and tier 14. The remaining block, 20a, 20b, 20c, 20d and 20e are implemented in 2D and spread distributed between tier 12 and tier 14. A network of vias (represented by arrow 32) provide communication paths for the multi-tier integrated circuit 10.

Figure 4:
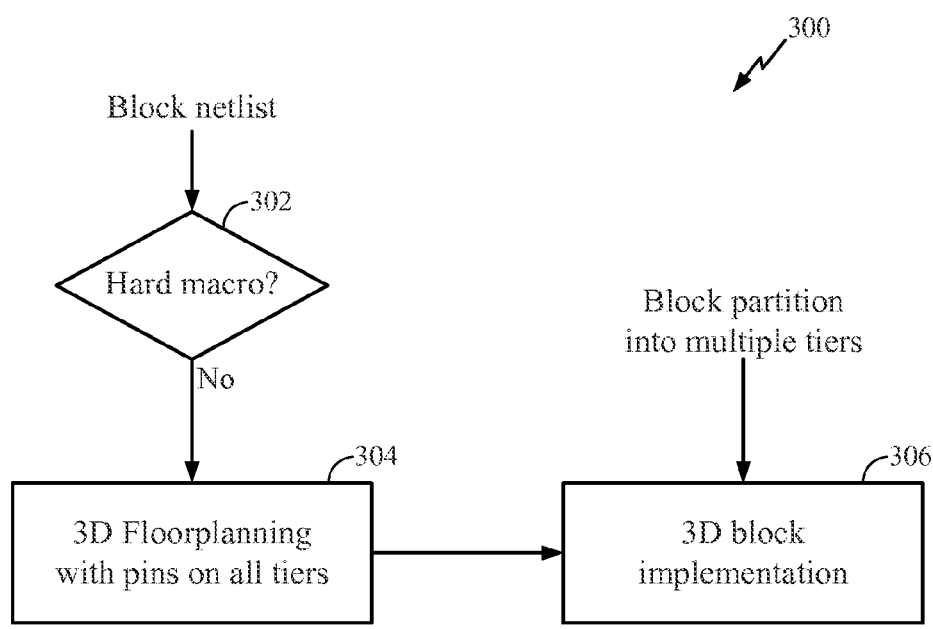
FIG. 4 illustrates the 3D pin assignment of the block design of the disclosed embodiments.

FIG. 4 illustrates a methodology 300 for making pin assignments for the 3D block design of the disclosed embodiments. The block netlist is evaluated and step 302 determines whether the 3D block is a hard macro. As a hard macro, the logic components and the physical pathways and wiring patterns between the components are specified. Thus, if the 3D block is a hard macro, the pin assignment as well as the block design have already been done. If the 3D block is not a hard macro, the interconnections of the required logic elements have been specified but not the physical wiring pattern. Hence, the 3D block is a soft macro. If the 3D block is a soft macro, the methodology 300 at step 304 allows the pins to be on each tier of the block then performs 3D floorplanning. Knowing the floorplan solution/inter-block connectivity, the pin locations can now be fixed. Using the pin assignment and a partitioning solution across the tiers, step 306 implements the block. The partitioning can be done using 2D or 3D methodologies.

The disclosed embodiments are particularly advantageous when the 3D implementation technology is of a type known generally as "monolithic." In monolithic 3D integrated circuits, electronic components and their connections (wiring) are built sequentially in layers on a single semiconductor wafer, which is then diced into 3D ICs. Initially each subsequent layer has no devices in it, hence there is no need for alignment resulting in greater integration density. A network of high density vias provides the communication paths for monolithic 3D ICs. Further, the disclosed embodiments include methodologies that may be used to construct new 3D IP blocks to be used in designs that are built using monolithic 3D integration technology. The new 3D IP blocks/cores of the disclosed embodiments can be utilized as reusable units of logic, cell, or chip layouts, which may be used for a larger design that includes the pre-designed block.

While the foregoing disclosure and illustrations show embodiments of the invention, it should be noted that various changes and modifications could be made herein without departing from the scope of the invention as defined by the appended claims. For example, the functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

Those of skill in the relevant arts will also appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. Accordingly, an embodiment of the invention can include a computer readable media embodying a method for performing the disclosed and claimed embodiment. Accordingly, the invention is not limited to illustrated examples and any means for performing the functionality described herein are included in embodiments of the invention.

What is claimed is:

1. A method of generating a library of circuit blocks to be floorplanned into a 3D integrated circuit, the steps comprising:

assembling, by a computing device, a plurality of circuit blocks comprising 2D circuit implementations and 3D circuit implementations;

providing a first additional tier for at least one of the plurality of circuit blocks and generating a first re-implementation of the at least one of the plurality of circuit blocks that includes the first additional tier;

evaluating at least one performance objective of the first re-implementation to determine whether the at least one performance objective has improved; and adding the first re-implementation to the library of circuit blocks to be floorplanned into the 3D integrated circuit if a result of the evaluating step is that at least one performance objective has improved, wherein the library of circuit blocks to be floorplanned into the 3D integrated circuit comprises a library of 3D monolithic circuit blocks, wherein at least one 3D monolithic circuit block includes one or more electronic components built sequentially in two or more layers on a single semiconductor wafer.

2. The method of claim 1, further comprising the steps of:

if the at least one performance parameter improved, providing a second additional tier for the at least one of the plurality of circuit blocks and generating a second re-implementation of the at least one of the plurality of circuit blocks that includes the second additional tier;

further evaluating the at least one performance objective for the second re-implementation to determine whether at least one performance objective has improved; and adding the second re-implementation to the library of 3D monolithic circuit blocks to be floorplanned into the 3D integrated circuit if a result of further evaluating step is that the at least one performance objective has improved.

3. The method of 2, further comprising the steps of floorplanning the library of 3D monolithic circuit blocks into the 3D integrated circuit.

4. The method of claim 3, wherein the step of floorplanning the library of 3D monolithic circuit blocks results in an IP circuit block that may be used for a larger circuit design that includes the IP circuit block.

5. The method of claim 4, wherein the step of floorplanning the library of 3D monolithic circuit blocks results in a monolithic 3D circuit floorplan having a network of high density vias.

6. The method of claim 5, wherein the network of high density vias comprises inter-tier vias.

7. The method of claim 3, wherein the step of floorplanning the library of 3D monolithic circuit blocks comprises floorplanning the library of 3D monolithic circuit blocks using a simulated annealing 3D floorplan engine.

8. The method of claim 3, further comprising determining pin assignments for the floorplanned library of 3D monolithic circuit blocks, wherein pin assignments are determined by:

determining whether the floorplanned library of 3D monolithic circuit blocks comprises a hard macro;

accepting existing pin assignments if the floorplanned library of 3D monolithic circuit blocks comprises a hard macro; and if the floorplanned library of 3D monolithic circuit blocks comprises a soft macro allowing pins to be on each tier of the floorplanned library of 3D monolithic circuit blocks and fixing a location of the pins using 2D partitioning methodologies.

9. The method of claim 1, wherein at least one of the 3D monolithic circuit block includes at least one electronic component on a single semiconductor wafer.

10. The method of claim 9, wherein the single semiconductor wafer is diced into 3D integrated circuits (ICs).

11. An integrated circuit, comprising:

at least one 3D monolithic circuit block having one or more electronic components built sequentially in two or more layers on a single semiconductor wafer; and at least one 2D circuit block coupled to the at least one 3D monolithic circuit block.

12. The integrated circuit of claim 11, further comprising:

a first tier; and a second tier coupled to the first tier.

13. The integrated circuit of claim 12, wherein the at least one 3D monolithic circuit block spans the first tier and the second tier.

14. The integrated circuit of claim 13, wherein the at least one 2D circuit block is distributed on the first tier.

15. The integrated circuit of claim 13, wherein the at least one 2D circuit block is distributed on the second tier.

16. The integrated circuit of claim 12, further comprising a network of vias coupling the first tier to the second tier.

17. A non-transitory computer-readable storage medium including data representing a library of circuit blocks that, when accessed by a machine, cause the machine to perform operations comprising:

assembling by the machine a plurality of circuit blocks comprising 2D implementations and 3D implementations of the library of circuit blocks;

providing a first additional tier for at least one of the plurality of circuit blocks and generating a first re-implementation of the at least one of the plurality of circuit blocks that includes said first additional tier;

evaluating at least one performance objective of the first re-implementation to determine whether the at least one performance objective has improved; and adding the first re-implementation to the library of circuit blocks to be floorplanned into a 3D integrated circuit, if a result of the evaluating step is that at least one performance objective has improved, wherein the library of circuit blocks to be floorplanned comprises a library of 3D monolithic circuit blocks, wherein at least one 3D monolithic circuit block includes one or more electronic components built sequentially in two or more layers on a single semiconductor wafer.

18. The non-transitory computer-readable storage medium of claim 17, further including data representing the library of circuit blocks that, when accessed by the machine, cause the machine to perform operations of: if the at least one performance parameter improved, providing a second additional tier for the at least one of the plurality of circuit blocks and generating a second re-implementation of the at least one of the plurality of circuit blocks that includes the second additional tier;

further evaluating the at least one performance objective for the second re-implementation to determine whether at least one performance objective has improved; and adding the second re-implementation to the library of 3D monolithic circuit blocks to be floorplanned into a 3D integrated circuit if a result of further evaluating step is that the at least one performance objective has improved.

* * * * *